United States Patent [19]

Lebovits et al.

[11] Patent Number: 5,194,504
[45] Date of Patent: Mar. 16, 1993

[54] ANTI-FOULING CASTABLE POLYMERS AND ANTI-FOULING POLYURETHANES AND SIMILAR MATERIALS

[75] Inventors: Alexander Lebovits, Baltimore; William L. Yeager, Queen Anne; William B. Mercer, Annapolis; Timothy L. Dapp, Bowie, all of Md.

[73] Assignee: The United States of America as represented by the Secretary of the Navy, Washington, D.C.

[21] Appl. No.: 641,836

[22] Filed: Jan. 16, 1991

Related U.S. Application Data

[63] Continuation-in-part of Ser. No. 239,351, Sep. 1, 1988, Pat. No. 4,996,261.

[51] Int. Cl.$^5$ ............................................. C08L 75/04
[52] U.S. Cl. ..................................... 525/131; 525/123; 523/122
[58] Field of Search ................................ 525/131, 123

[56] References Cited

U.S. PATENT DOCUMENTS 4,497,852 2/1985 Lane et al. .......................... 427/287

Primary Examiner—Ana L. Carrillo
Attorney, Agent, or Firm—Luther Marsh; Gary G. Borda

[57] ABSTRACT

This invention relates to polymeric materials formable by casting at room temperature and having antifouling material incorporated therein. It is the reaction product of a) with polyether polyols and methylene bis (4-cyclohexyl) isocyanate, where a) is a polymer composition which is the reaction product of the distilled tributyltin oxide with a copolymer of either methyl methacrylate or methyl acrylate and, with either methacrylic acid or acrylic acid in such proportion that four (4) percent of the carbonyl groups remain unreacted.

16 Claims, No Drawings

ANTI-FOULING CASTABLE POLYMERS AND ANTI-FOULING POLYURETHANES AND SIMILAR MATERIALS

The invention described herein may be manufactured and used by or for the Government of the United States of America for governmental purposes without the payment of any royalties thereon or therefor.

This application is a continuation-in-part of application Ser. No. 07/239,351 filed Sept. 1, 1988, now, U.S. Pat. No. 4,996,261.

BACKGROUND OF THE INVENTION

This invention relates to a method and composition for preventing for an extended period of time fouling of submersed or submerged objects or marine structures while also minimizing pollution and more particularly to a method and composition consisting of polyurethanes and similar castable polymers. The incorporation of organotin compounds into polyurethanes has heretofore been unsuccessful.

From the beginning of man's attempt to use water to travel, he has been plagued with the problem of his ships, buoys, pilings, or other objects placed in the water, being fouled by organisms present in the water. It has been found that microorganisms, their viscous bio-organic products and absorbed organic matter, constitute a tenacious, opaque slime which forms on these submerged surfaces. The initial organisms in this fouling sequence are bacteria followed by a biotic progression of diatoms, hydroids, algae, bryozoans, protozoans, and finally macrofoulants, such as barnacles.

The resultant effect of a concentration of these plants and animals settling and attaching themselves to ships are well known: they contribute significantly to speed reduction; they increase fuel consumption, and, in the area of concern of water craft detection, they strengthen the noise signature of vessels under way thereby rendering covert activity more difficult. Also, fouling of sonar domes has been found to seriously limit the active and passive modes of operation of ships' acoustical systems.

This problem of marine growth (fouling) applies not only to vessels but also to other submersed and submerged objects. For example, fouling of moored data systems and ship-and-shore facilities by marine organisms impedes operations and necessitates a large maintenance allocation. Buoys shift due to the excessive weight of fouling organisms. Effective operation of sonars is hampered by the self-noise generated by the fouling of sonar dome surfaces. Wood pilings in berthing facilities undergo structural weakening and ultimate destruction due to marine borer and fungal attack.

It is only since the beginning of this century that improvements have been made in the early Phoenician methods of using copper cladding and poisonous paints to prevent fouling. Some of these improvements include the use of asphalt as an antifouling coating and paints containing copper, or salts, or organic derivatives of tin, lead, mercury, arsenic or phosphours, as well as organic toxic materials such as salicylanilides, chlorinated hydrocarbons, polychlorophenols, and aryl or alkyl nitriles. Of these, mercury, arsenic, and lead are no longer used because of the occupational hazards associated with their manufacture and application, their toxicity to humans and non-target marine life and because tin compounds are far better. Copper compounds have the disadvantages of promoting galvanic corrosion, especially of aluminum hulls, and also they do not repel algae along the waterline. Most if not all paints have the disadvantages of a fast and uncontrolled leaching rate which depends on external factors such as coating age, ship velocity, salinity, temperature and the composition of the primary slime layer. The fast leaching rate, in turn, results in concentrations of the toxicant well above normal oceanic background and well above what is needed to prevent fouling (so called "overkill") and excessive impact on the environment. It also results in fast depletion of the toxicant and shortens the service life of the paints which necessitates frequent repainting. In addition, some paints lack durability and integrity. The need to peel or blast off old paint before repainting results in further pollution of the environment. The total cost of fouling runs in many hundreds of millions of dollars and solutions better than paints are urgently needed.

Such improvement came about with the inventions describing chemically bonding organotin compounds to polymeric materials, either by attaching them to polymeric backbones via ester groups or by incorporating them into elastomers whether or whether not such incorporation is by chemical bonding by a covulcanization process. The end products are either structural materials such as glass-reinforced or non-reinforced plastics, and rubbers. Such structural materials do not need painting by antifouling paints because they already contain the organotin moiety bound to a polymeric backbone and capable of breaking off by hydrolysis and poisoning the offensive organisms. The improvement consists of a low leaching rate resulting in avoidance of excessive toxicant emission, avoidance of "overkill", reduction of the environmental impact by a factor of 10 or more, and extension of the service life of such paints, or structural materials not needing painting, to a service life of 5 to 10 years from the typical 1½ or 2 years available from older type paints. The reasons for this improvement are believed to be due to the leaching rate being governed by the rate of hydrolysis of the ester group linking the organotin moiety to the polymer backbone, said rate being independent, or less dependent, on external factors such as salinity, speed, primary slime layer and other factors than the mechanism of leaching and defoliation characteristics of conventional paints. Another theory assumes that hydrolysis is catalyzed by the body fluids of the attaching fouling animal. Materials for which this latter theory is true would have ideal antifouling properties consisting of a surface toxic only to the attaching fouling organism but almost completely non-polluting to the environment. In either case the carboxylic groups on the polymer chain which are generated through hydrolysis make the polymer hydrophillic enough to dissolve and regenerate a new toxic surface. Regardless of theoretical consideration, field tests have shown the new generations of antifouling materials far better than conventional paints in terms of reduced environmental impact and increased service life.

Examples of new structural antifouling material not needing painting are vinyl polymers such as acrylates and methacrylates, polyesters, epoxies, alkyds, and maleic anhydride copolymers described among others in U.S. Pat. No. 4,082,709 and elsewhere, some of said polymers being suitable for glass reinforcement or for transparent film formation. Other elastomeric antifouling materials such as natural rubber, neoprene (polychloroprene rubber), butyl rubber (isobutylene/isoprene copolymer rubber), SBR (styrene/butadiene rubbers), polybutadiene rubbers such as cis-polybutadiene rubber, synthetic polyisoprene rubbers such as cis-polyisoprene or synthetic natural rubber, nitrile rubbers (butadiene/acrylonitrile copolymers), ethylene/propylene/dicyclopentadiene and other ethylene/propylene/diene terpolymers, and others are described in U.S. Pat. No. 3,639,583.

It has however so far not been possible to synthesize structural antifouling polyurethanes and similar materials although paints in which the polymeric material is a solvent-soluble polyurethane have been described below as exemplified by U.S. Pat. No. 4,554,185. The difficulties to synthesize such structural antifouling polyurethanes are surmised to be due to the catalytic effects that some organotin compounds have on the reaction of isocyanates and thioisocyanates with polyols and other suitable reactants. This causes a run away polymerization which is manifested by an exotherm and premature gelation which reduces the pot life to unmanageable short durations. Such difficulties are not to be expected in paints as described in U.S. Pat. No. 4,554,185 in which the inventors have kept the isocyanate concentration low (never above 5.24%). Consequently the occurrence of a runaway polymerization is less likely even if organotin compounds having a cataytic effect on the polyurethane reaction are present. In addition if runaway polymerization does occur it would not render the paints less useful since in a paint, in contrast to a structural material, there is no need for a pot life. The inventors of U.S. Pat. No. 4,554,185 specify that either the isocyanate or the diol must be monofunctional in order to prevent crosslinking. This avoidance of crosslinking is needed so that polymeric material of the paint shall remain soluble in its solvent. Thus a paint is applicable to the surfaces to be painted regardless of whether or not runaway polymerization occurs. In contrast to this a thermosetting polymer, such as the one of our invention, which is intended to set to a structural material ought to be crosslinked. This required that both monomeric reactants be multifunctional and have a pot life which is long enough to enable mixing and pouring into a mold. This in turn requires absence of impurities which will cause runaway polymerization.

Structural polyurethanes have the advantages of castability, sprayability, excellent physical properties and great versatility enabling varying the consistency of the final product from a soft rubber to a hard plastic or a flexible or a rigid foam. Thus, there is a continuing need for further development utilizing the incorporation of proper toxic materials into polyurethanes. This invention accomplishes these goals.

OBJECTIVES OF THE INVENTION

It is an objective of the present invention to impart long lasting antifouling and non-polluting properties to structural polyurethanes and similar polymers.

It is also an objective of the present invention to utilize the advantages of this class of resins, particularly their castability, excellent physical properties, versatility, sprayability, durability and suitability for formation of coatings for water immersion resistance.

These and other objectives, as made apparent hereinafter, are accomplished by preparing polyurethanes for casting various objects that are to be submerged in sea water according to the procedure given below.

SUMMARY OF THE INVENTION

In accordance with the present invention a new long lasting antifouling composition has been found which comprises a novel polymeric composition formable by casting or spraying at room or elevated temperatures and having antifouling materials incorporated therein and to a method for its preparation which comprises (a) purifying bis(tri-n-butyltin) oxide (TBTO) by distillation to at least about 98% purity, (b) reacting the purified bis(tri-n-butyltin) oxide with a copolymer of methyl methacrylate and methacrylic acid in such proportion that a small percentage of the carboxyl groups remain unreacted, (c) either mixing the reaction product of (b) with polyether or polyester polyols and di- and/or polyisocyanate(s), or (d) mixing the reaction product of (b) with prepolymers (described infra) and a resin (also described infra) and finally either casting the reaction mixture of (c) or (d) into a mold and allowing it to cure into a structural antifouling polymeric composition or spraying the mixture of (c) or (d) onto the surfaces to be coated and allowing the material to cure into a structural antifouling polymeric composition.

DESCRIPTION OF THE PREFERRED EMBODIMENTS

The present invention provides a novel polymeric composition possessing low leaching biocidal properties, high toxicity to marine growth with minimum possible impact on the environment and relatively low toxicity to humans. It comprises (a) purifying TBTO by distillation, (b) reacting this purified TBTO with a copolymer of methyl methacrylate and methacrylic acid in such proportion that a small percentage of the carboxyl groups remain unreacted, and (c) reacting diols and/or polyols with di- and/or polyisocyanates(s) or prepolymers (resins described infra) with curing agents (also described infra) in the presence of said reaction product formed under (b).

The following examples illustrate the invention.

EXAMPLE 1

This example, as well as, Examples 3 and 5, illustrate the antifouling efficiency of the antifouling component which was the organometallic polymer (OMP) prepared from 98% pure bis (tri-n-butyltin) oxide (TBTO), by the esterification of a copolymer of methacrylic acid and methyl methacrylate with TBTO. The methacrylic acid/methyl methacrylate ratio in the above copolymer is about 1:1 and the amount of TBTO used is sufficient to esterify 96% of the free carboxyl groups. The polymerization is carried out in a methanol/methyl ethyl ketone (MEK) mixture. TBTO, dissolved in Shell Sol 340, (a mixture of hydrocarbons with a boiling range of 160°–180° C., a product of the Shell Chemical Co., Houston, Texas) is added, and the water formed in the reaction, as well as the methanol and MEK, is distilled off to give a solution of tri-n-butylin methacrylate/methyl methacrylate/methacrylic acid terpolymer in the hydrocarbon, containing about 45% solids. To a 1-liter suction flask 115 grams of this OMP solution are added and a vacuum of less than 1 mm is applied to remove any traces of remaining water. This also removes a small amount of the less volatile solvent used to suspend or dissolve the OMP. After releasing the vacuum with dry nitrogen there are added 47 grams of Pluracol 440, 336 grams of Pluracol 2010 and 101 grams of Desmodur W. These materials are mixed and degassed by swirling the flask while applying a vacuum which removes any entrapped air or carbon dioxide formed in the reaction between the isocyanate with traces of water and with the carboxyl groups of the OMP. The reaction mixture is then forced through a polyethylene tube into an empty evacuated polyethylene bag by applying 5 psi nitrogen pressure to the flask. The bag is then flattened between metal plates and thus forms a mold for molding 10×12 inch sheets with exclusion of air. After standing overnight, the reaction mixture is solid and the bag is peeled off. The OMP/polyurethane copolymer panel is then exposed to brackish water for 140 days along with a panel not containing OMP as made in Example 2 for comparison purposes. The panel of Example 1 remained completely clean after 140 days whereas the panel of Example 2 was somewhat encrusted after only 25 days and was completely encrusted after only 140 days.

Further descriptions of the components used in Example 1 and other examples are as follows: Pluracols are polyols made from propylene oxide by BASF Wynadotte Corp. wherein the active hydroxyl groups are secondary alcohol groups. The molecular weight for Pluracol 440 is 425, the functionality is 3 and the hydroxyl value is 7.1 milliequivalents per gram (meq/g). For Pluracol 2010 the molecular weight is 2000, the functionality is 2 and the hydroxyl value is 1 meq/g. Both Pluracols are dried before usage over "Molecular Sieves" made by the W. R. Grace & Co. Baltimore, Md. Desmodur W. is methylene bis (4-cyclohexyl isocyanate) made by the Mobay Chemical Corp. and is used as received except for heating and mixing before usage if storage at low temperature had caused crystallization.

EXAMPLE 2

The procedure is the same as in Example 1 except that the OMP is left out, 5 drops of dibutyltin laurate are added as a catalyst, and all other materials are increased proportionally to be a total of 600 grams. The resultant panel was exposed as in Example 1, and as mentioned above in Example 1 it became fouled with some marine growth after 25 days and completely encrusted with barnacles after 140 days.

EXAMPLES 3-6

In these examples, polyurethane chemicals from Ren Plastics Co., are substituted for the Pluracol's and the Desmodur W. of Examples 1 and 2. In Examples 3 and 5, 20 parts per hundred (pph) OMP is added. In Examples 4 and 6 no OMP is added. The reaction mixture is mixed and degassed as in Example 1. The reaction mixture is then poured from the suction flask into disposable molds consisting of polyethylene lined cardboard, without special provision to exclude air and atmospheric moisture. Upon setting, these panels are removed from their molds and exposed in brackish water with the following results:

The panels of Examples 3 and 5, which contained 20 parts per hundred OMP remained completely clean after 140 days, and the panels from Examples 4 and 6 having no OMP were badly encrusted after only 25 days and completely encrusted after 140 days.

The polyurethane chemicals used in these examples and manufactured by Ren Plastics Co. comprise two components called "resin" and "hardener" by Ren Plastics. Said resin consisting of aromatic and/or aliphatic diisocyanates and said hardeners being compounds or mixtures containing active hydrogen. Both resin and hardener may contain other materials not detrimental to their normal and expected use. Table 1 gives the information provided by Ren Plastics for the normal use of these materials. This information is incomplete since the materials are proprietary and Ren Plastics revealed only as much as safety consideration required.

TABLE 1

PROPERTIES, MIXING RATIOS AND SOME COMPONENTS OF POLYURETHANES FROM REN PLASTICS

| System No. | RP6410 | RP6413 |
|---|---|---|
| Hardness, Shore A | 35–40 | 90–94 |
| Mixing ratios R/H | 100/100 | 100/58 |
| Specific Gravity | 1.04 | 1.04 |
| Hardener | 20–30% di (2-ethylhexyl) phthalate | less than 10% methylene dianiline, 55–65% dibutyl phthalate |
| Catalyst (contained in the hardner) | less than 1% aryl mercury | None |
| Resin | 20–30% MDI | 5–15% methylene bis (4 cyclohexyl) isocyanate and 10–20% isophorone diisocyanate |
| Other components | unspecified | unspecified |

Table 2 gives the composition of antifouling polyurethanes and controls based on Ren Plastics Systems.

TABLE 2

COMPOSITION OF ANTIFOULING POLYURETHANES AND CONTROLS BASED ON REN PLASTICS

| Example No. | 3 | 4 | 5 | 6 |
|---|---|---|---|---|
| Ren Plastics System | RP6410 | RP6410 | RP6413 | RP6413 |
| Polymer composition pph (by weight) OMP solution | 20.0 | 0 | 19.8 | 0 |
| Resin | 40.2 | 50 | 51.0 | 63.3 |
| Hardener | 38.9 | 50 | 29.2 | 36.7 |
| Exposure Time | 122 | 140* | 140 | 140* |

*Badly encrusted after 25 days.

Numerous attempts to create a satisfactory polyurethane having antifouling properties have been thwarted in the past by the rapid catalytic action caused by dibutyltin compounds or other unspecified compounds which contaminated the primary antifouling ingredient, TBTO. These catalytically active impurities caused rapid catalytic action, runaway polymerization, and thus resulted in end-products having very limited pot life (the time between mixing and solidification of the material). Upon numerous tests, reviewing each ingredient in intimate detail, it was observed that the success of the present effort was achieved by using an ester of a highly purified TBTO with a copolymer of methacrylic acid and methyl methacrylate in the subsequent polymerization of the successful and useful antifouling polyurethane. It is surmised that the purification process of the TBTO used in the preparation of the polymeric organotin ester, which involved successive distillations, removed the dibutyltin contaminants responsible for previous unsuccessful polyurethanes syntheses and resulted in the present success, said success being polyurethanes having excellent antifouling properties with high toxicity to barnacles and other marine fouling organisms yet having low toxicity to humans, a low leaching rate and thus an expected long lasting fouling-free service life and minimal impact on the environment.

Practice of the present invention should not be restricted to the antifouling tin compounds and polyurethane chemicals mentioned in the examples. Antifouling polyurethanes could be prepared without deviation from the spirit of this invention using tin compounds other than TBTO, purification methods other than distillation, isocyanates other than the ones mentioned, diols or polyols other than Pluracols or even compounds which are not polyols but contain active hydrogen capable of reacting with isocyanates. In connection with this it should be mentioned that it is well known common practice in the polyurethane industry to use so called "prepolymers" sometimes called resins and curing agents sometimes called "hardeners" as the components for casting polyurethanes, or forming polyurethanes by spraying or by the so called "RIM" (Reaction Injection Molding) process, or allowing polyurethanes to cure through reaction with the moisture of the air. In each instance a structural antifouling polymeric composition is to be obtained. The prepolymers are usually reaction products of diisocyanates or polyisocyanates with an insufficient quantity of polyols or other compounds containing active hydrogen, and the hardeners are usually, although not always, amines. Both the prepolymers and the hardeners either may or may not contain catalysts which may be metal compounds, amines, or strong bases, the task of said catalysts being either to speed up the reaction rate, or to steer the reaction towards taking a desirable course in preference of side reactions which would lead the reaction in an undesired course. The undesired course may be, for instance, a reaction leading towards more branching than desirable. Either of the components (prepolymers and hardener) may also contain other additives which can be inert or active in the sense of either retarding the reaction or influencing the catalyst or reactants in one way or another.

The advantages of using prepolymers are a smaller exotherm and, more importantly, avoidance of exposing the final compounders to the obnoxious fumes of volatile isocyanate which can irritate their respiratory organs, as well as reducing the dermatalogically undesired effects of isocyanates. The final products of such prepolymers and either amines or atmospheric moisture, although loosely called polyurethanes, are strictly speaking polyurethane/polyurea copolymers. More specifically they can be considered as co-, ter- or multipolymers consisting of some or all of the polymeric components polyesters, polyethers, polyurethanes, polyureas, components of antifouling additives, components of other additives and possible other polymeric entities, said polymeric entities being linked together by chemical linkages comprising urethane, urea, ester, ether, allophanate, biuret and possible other chemical linkages and configuration of said polymers being random, graft, block, IPN (interpenetrating networks), or mixtures of some or all of the above or other chemical linkages.

Regardless of these semantics and the differences in the synthesis of polyurethanes from prepolymer rather than from primary ingredients, it should be understood that incorporation of organotin containing compounds in which the organotin had been purified and incorporated in either the prepolymer or the hardener for the purpose of forming antifouling polyurethane-like castable plastics should be considered as falling within the scope of this invention.

It is not common to react diols or other active hydrogen containing compounds with a deficient amount of isocyanates and then cure such reaction products with iscyanates since such practice would not eliminate any obnoxious effect of isocyanates on personnel handling them. However, such synthesis is possible. and if used to prepare antifouling polyurethanes by incorporation of purified organotin compounds into such mixtures it should not be considered a deviation from the spirit of this invention.

In the examples of this invention the organotin containing additive (referred earlier as OMP) is an ester of bis (tri-n-butyltin) oxide and a copolymer of methyl methacrylate and methacrylic acid in which most, but not all, of the free carboxyl groups are esterified. These specifications are not critical for this invention. Changing the solvent from Shell Sol 340 to any other suitable solvent, or substitution of methacrylic acid by any other unsaturated acid, whether a carboxylic acid or another type of acid, such as, but not limited to, sulfonic acids, said unsaturated acid being capable of homo- or copolymerization, or by a mixture of such acids, or by esters(s) of unsaturated acid(s) with an antifouling organotin moiety(ies) or substitution of methyl methacrylate by any monomer capable of copolymerization with said acid(s) or by a mixture of such monomers or changing the ratio of the acid-type monomers to the non-acid-type monomers should not constitute a significant deviation from the spirit of this invention as long as enough acidic groups are present to enable esterification by a sufficient amount of organotin to enable antifouling activity. Similarly esterification of only a small portion of the free carboxyl groups, or other acidic groups, or all of the acidic groups, or even the use of more organotin compound than is needed to esterify all of the acidic groups, should also not constitute significant deviation from the spirit of this invention. Similarly substitution of the normal butyl groups in bis(tri-n-butyltin) oxide by other alkyl, aryl or cycloalkyl groups or a mixture thereof, or substitution of organotin hydroxides for the oxides, or purification of the organotin compound by methods other than distillation such as, but not limited to, chromatography or crystallization, should also not constitute significant deviation from the spirit of this invention. Similarly substitution of the isocyanates used in the examples by other isocyanates, or thioisocyanates, or substitution of the Pluracols used in Example 1, or the amine used as hardener in Examples 5 and 6, by other polyether diols, polyester diols, other amines, or other compounds containing active hydrogen capable of reacting with isocyanates or thioisocyanates, whether such substitutions occur in the prepolymer, or whether it occurs in the hardener, or in the production of the final products regardless of whether or not prepolymers are used as intermediates, should not consitute significant deviation from the spirit of this invention. Neither should the addition of inert or active additives constitute such deviation.

Obviously, many modifications and variations of the present invention are possible in the light of the above teachings. It is therefore to be understood that, within the scope of the appended claims, the invention may be practiced otherwise than as specifically described.

What is claimed is:

1. A process for preparing a structural antifouling polymeric composition consisting of:
   (a) purifying an organotin compound selected from the group consisting of bis (tri-alkyltin) oxide, bis (tri-aryltin) oxide, bis (tri-cycloalkyltin) oxide, and tri-cycloalkyltin hydroxide by distillation or other suitable process to at least about 98% purity, (b) synthesizing a copolymer by the copolymerization of monomers selected from the group consisting of esters of acrylic acid and esters of methacrylic acid with monomers selected from the group consisting of acrylic acid and methacrylic acid, (c) reacting said organotin compound of (a) with said copolymer of (b) to form a polymeric tin-containing ester and choosing the proportions of (a) and (b) so that less than about 4% of the carboxyl groups of (b) remain unreacted, and (d) mixing the reaction product of (c) with
  (1) isocyanates selected from the group consisting of polyisocyanates of from about 500 to about 5000 molecular weight, and mixtures thereof, and polythioisocyanates of from about 500 to about 5000 molecular weight, and mixtures thereof, wherein said polyisocyanates and polythioisocyanates are reactive with more than one group selected from the group consisting of hydroxyl groups, amino groups and a combination thereof, and
  (2) active hydrogen containing compounds having in the same molecule more than one functional group selected from the group consisting of hydroxyl, amino, carboxyl, water and mixtures thereof, wherein said active hydrogen containing compounds are reactive with isocyanates and thioisocyanates, and said mixture being done with an amount of reaction product of (c) to impart antifouling properties to the final composition.

2. A process for preparing a structural antifouling polymeric composition as in claim 1, wherein the ratio of the monomeric ester and monomeric acid used in step (b) ranges between 40:60 and 60:40.

3. A process for preparing a structural antifouling polymeric composition as in claim 1, wherein the amount of the purified organotin compound reacted with the copolymer formed in (b) is such that at least about 96% of the free carboxyl groups are esterified.

4. A process for preparing a structural antifouling polymeric composition as in claim 1, wherein the active hydrogen containing compounds used in step (d) are selected from the group consisting of compounds containing hydroxyl groups, compounds containing amine groups, compounds containing both hydroxyl and amine groups and mixtures thereof.

5. A process for preparing a structural antifouling polymeric composition as in claim 1, wherein the isocyanate used in step (d) is multifunctional isocyanate.

6. A process for preparing a structural antifouling polymeric composition as in claim 1, wherein the monomers used in step (b) are methyl methacrylate and methacrylic acid.

7. A process for preparing a structural antifouling polymeric composition as in claim 1, wherein the organotin compound is selected from the group consisting of bis(trialkyltin) oxide bis(triaryltin) oxide and bis(tricycloalkyltin) oxide.

8. A process for preparing a structural antifouling polymeric composition as in claim 1, wherein the organotin compound is bis(tri-n-butyltin) oxide.

9. A process for preparing a structural antifouling polymeric composition as in claim 1, wherein the purification of the organotin compound described in step (a) is carried out by means of distillation.

10. A process for preparing a structural antifouling polymeric composition as in claim 4, wherein the isocyanate used in step (d) is a multifunctional isocyanate.

11. A process for preparing a structural antifouling polymeric composition as in claim 10, wherein the purification of the organotin compound described in step (a) is carried out by means of distillation.

12. A process for preparing a structural antifouling polymeric composition as in claim 11, wherein the organotin compound is selected from the group consisting of bis(tri-alkyltin) oxide bis(tri-aryltin) oxide and bis(tricycloalkyltin) oxide.

13. A process for preparing a structural antifouling polymeric composition as in claim 11, wherein the organotin compound is bis(tri-n-butyltin) oxide.

14. A process for preparing a structural antifouling polymeric composition as in claim 13, wherein the polymer synthesized in (b) is a copolymer of methyl methacrylate and methacrylic acid.

15. A process for preparing a structural antifouling polymeric composition as in claim 14, wherein the ratio of methyl methacrylate and methacrylic acid ranges between 40:60 to 60:40.

16. A process for preparing a structural antifouling polymeric composition as in claim 15, wherein the bis(tri-n-butyltin) oxide esterifies between 96 and 99.8% of the carboxyl groups of the acrylic copolymer synthesized in (b).

* * * * *